United States Patent [19]

Mayama et al.

[11] 4,051,302

[45] Sept. 27, 1977

[54] METHOD OF IMPROVING ADHESIVE PROPERTY OF PLASTIC SUPPORTS

[75] Inventors: Masayoshi Mayama; Kiyoyuki Miura, both of Hino, Japan

[73] Assignee: Konishiroku Photo Industry Co., Ltd., Tokyo, Japan

[21] Appl. No.: 663,076

[22] Filed: Mar. 2, 1976

[30] Foreign Application Priority Data

Mar. 4, 1975 Japan .................................. 50-26384

[51] Int. Cl.$^2$ .............................................. B05D 3/06
[52] U.S. Cl. ..................................... 428/411; 427/54; 428/500

[58] Field of Search ..................... 427/54, 38, 40, 322

[56] References Cited

U.S. PATENT DOCUMENTS

| | | | |
|---|---|---|---|
| 2,878,519 | 3/1959 | Wolinski | 427/316 |
| 3,811,913 | 5/1974 | Kasugai et al. | 427/54 |
| 3,892,575 | 7/1975 | Watts et al. | 427/54 |

*Primary Examiner*—John H. Newsome

[57] ABSTRACT

The adhesive property of plastic supports is improved by coating the support with an aqueous solution of hydrogen peroxide and a hydrophilic polymer and, while still wet, irradiating with ultraviolet rays.

2 Claims, No Drawings

METHOD OF IMPROVING ADHESIVE PROPERTY OF PLASTIC SUPPORTS

This invention relates to a method of improving the adhesive property of plastic supports.

Plastic films or sheets are often used as supports for obtaining so-called composite products by coating said films or sheets on their surface with various materials. As materials to be coated on the surfaces of such plastic supports, there may be mentioned, for example, various photographic layers including silver halide emulsion layers for constituting light-sensitive silver halide photographic materials, recording layers for electrostatic recording, high molecular substances for lamination, hydrophilic layers for printing ink and water-color ink and the like.

In a process for coating such various materials on the surface of plastic support, many attempts have heretofore been made to improve adhesive property of the plastic support. Particularly, however, it is very difficult to allow a hydrophilic material to adhere to a plastic support which is hydrophobic because the hydrophobic plastic support has no affinity for the hydrophilic material. Nevertheless, the reason why hydrophobic plastic supports are used often enough with the view of coating hydrophilic materials thereon is considered ascribable to the fact that because of excellent characteristics in physical properties of hydrophobic plastic supports, the use of such plastic supports is a desideratum for the fields where hydrophilic materials are dealt with. For instance, in the technical field of light-sensitive silver halide photographic materials, the photographic layers used are composed of hydrophilic materials in most cases and, as a typical plastic support which carries thereon the hydrophilic materials of the kind, there is a polyester support, more particularly a polyethylene terephthalate support. The polyethylene terephthalate support is extremely high in hydrophobic property, though it is excellent as a support for light-sensitive photographic material because of its excellency, for example, in mechanical properties (concretely speaking, strength, hardness, certain kind of plasticity, etc.), flatness and, in some cases, transparency and the like. In order to attain the adhesion of a hydrophilic material to a highly hydrophobic plastic support, there is generally adopted such surface treatment of the support, for example, as matting the support surface (including such mechanical matting techniques commonly known as sandblast, such chemical matting techniques as relying on the use of swelling agents for the support, etc.), saponification treatment of the support surface, or subbing treatment to form a sub layer on the support, for example, forming such a sub layer as having a multilayer construction so that affinity of the sub layer for the hydrophilic material may be gradually enhanced within the multilayer construction from its support side to its upper side. However, in the case of such surface treatment where the treatment operation is simple, the adhesion thus attained between the thus treated support and the hydrophilic material is generally unsatisfactory and, on the other hand, in the case of such treatment where the adhesion attained can be sufficiently improved, the treatment operation becomes extremely complicated and hence the treatment itself is found to lack industrial usefulness. Particularly, when this treatment is adopted in the field of light-sensitive photographic materials, audio recording tapes or the like, there are brought about such drawbacks that an adverse influence is often exerted, for example, on strictly required characteristics of the hydrophilic material used, more concretely, speed, fog, recording characteristic and the like, or such physical characteristics as flatness, smoothness, elongation, strength and the like.

As typical concrete examples of plastic supports having improved adhesive property known heretofore, there may be mentioned, for example, a polyester film having coated thereon a vinylidene chloride type terpolymer, a plastic support having coated thereon a layer obtained by copolymerizing a monomer being able to form a polymer having affinity for a hydrophobic support with gelatin, or a plastic support having coated thereon a layer of a copolymer comprising a vinyl alcohol haloester as the main component. However, no sufficient adhesion of the hydrophilic substance to the support is obtained by forming only such layer on said support. As a practical matter, such layers should contain therein a compound which is capable of swelling or solubilizing the plastic support, for example, phenols, halogenated acetic acid or the like. The compounds of this kind, however, are generally harmful to the human body, and not only does the handling of such compounds create an inadequate operation environment but also the discharging of vaporized compounds of this kind as such leads to the cause of air pollution. Furthermore, because of the presence of the compounds of this kind, the support tends to deteriorate in homogeneity, flatness, smoothness or the like, and hence the use of such compounds is not desirable.

Further, there have been attempts to improve the adhesion of a plastic support to a hydrophilic material by changing properties of the support surface, wherein the support is subjected to corona discharge treatment, glow discharge treatment under reduced pressure, flame treatment or ultraviolet irradiation treatment. Although these treatments, even when applied independently, may contribute to improvement of the adhesion, they may be also applicable in combination with a coating technique of forming an adhesive polymer layer on the support surface, said coating technique comprising coating the adhesive polymer, for example, vinylidene chloride type terpolymer, on the support surface which has been previously subjected to such treatment, or coating first the support surface with a solution containing the adhesive polymer, for example, a hydrophilic polymer, followed by drying and then subjecting the thus coated support surface to such treatment. For instance, in the case of applying the ultraviolet irradiation treatment, there have been known such various processes as a process in which the plastic support surface is subjected only to the ultraviolet irradiation treatment, a process in which the ultraviolet irradiation is carried out in the presence of $O_2$ or $O_3$, a process in which the plastic support surface is first coated with a polymer solution containing a hydrophilic polymer, for example, a polymer containing a cyclic amide group and/or such group as —OH, —COOH, —SO$_3$H, or —COOCO, together with a film hardening agent and ammonia and the support surface thus coated is then irradiated with ultraviolet rays, a process in which the support surface previously coated with hydrogen peroxide solution is irradiated with ultraviolet rays and the support surface thus treated is then coated with such hydrophilic resin as gelatine in the form of organic solvent solution containing a solvent or swelling agent for the support, or a process in which the support surface having coated therewith hydrophilic monomers is irradiated with ultraviolet rays. In these processes, however, there are involved such inconveniences that a long period of time is required to obtain the necessary adhesion, that the process which requires multistage steps is industrially expensive, that when a solvent or swelling agent for the support is used, there should be used such substance harmful to the human body, for example, as pchlorophenol, monochloroacetic acid or the like, which is used when the support is composed of polyethylene terephthalate, and that when organic solvents, though they are not so harmful, are used, an additional treatment apparatus for the recovery of such solvents after use becomes necessary. Thus, these processes can hardly be said to be those which are of practical use, and therefore development of more excellent process has been desired.

A first object of the present invention is to provide a method of improving a plastic support in its adhesion to a hydrophilic material. A second object of the invention is to provide a plastic support having an excellent adhesive property to a hydrophilic material. A third object of the invention is to provide a plastic support which has an improved adhesive property, is excellent in flatness as well as smoothness, and is inexpensive, said support being produced rapidly and easily A fourth object of the present invention is to provide a method of improving adhesive property of a plastic support by means of a treatment step wherein the use of organic solvents which exert an adverse influence on the human body or atmosphere is not needed. A fifth object of the invention is to provide a plastic support having an improved adhesive property, especially excellent characteristics in the field of photographic materials, recording materials or the like.

The present invention has found that the abovementioned objects can be accomplished by coating the plastic support surface with an aqueous liquid containing both a hydrophilic polymer having an hydrophilic property above a certain level and hydrogen peroxide and irradiating the thus coated surface with ultraviolet rays while keeping said surface in a wet state where the hydrogen peroxide is present.

As ultraviolet rays used in the present invention, there may be utilized those available from a mercury-arc lamp, arc lamp and any other sources of ultraviolet rays. Ultraviolet rays having a wavelength of 200 to 400 m$\mu$ is particularly effective, and a low pressure mercury-arc lamp is one of the preferred sources of ultraviolet rays.

Usable as hydrophilic polymers in the present invention, except a case where they are used in the form of latex, are those which must be soluble in water or mixed solvent comprising more than 50 vol.% of water and an organic solvent, particularly preferable are watersoluble polymers.

The polymers having such hydrophilic property include natural high molecular compounds such as gelatine, starch, dextrin, mannan, pectin and gum arabic; modified products of such natural high molecular compounds as carboxymethyl cellulose, cellulose acetate phthalate, acylated gelatine and their salts; synthetic high molecular compounds containing, as a whole or part of the monomer component, vinyl alcohol, acrylic acid, methacrylic acid, maleic acid, fumaric acid, itaconic acid, vinyl amine, vinyl pyridine, vinyl imidazole or their salts; ionene type polyammonium compounds; and modified high molecular compounds obtained by modifying the aforementioned synthetic high molecular compounds or compounds having other active groups (e.g. synthetic high molecular compounds having, at least as a part of the monomer component, glycidyl methacrylate, vinyl monochloroacetate, acrylonitrile, maleic anhydride, maleic acid imide and the like) with polyvalent amines such as ethylene diamine, piperidine and phenylene diamine, polybasic acids such as succinic acid, adipic acid, maleic acid, fumaric acid, itaconic acid, phthalic acid, naphthalic acid, pyromelitic and sulfobenzoic acid, hydroxycarboxylic acids such as malic acid, tartaric acid, citric acid, salicylic acid, resorcylic acid and gallic acid, amino acids such as alanine, leucine, serine, phenylalanine and glutamic acid, and polyhydric alcohols such as ethylene glycol, glycerine, resorcinol and pyrogallol (as used herein, the term "monomer component" is intended not only to designate the starting material used actually for the synthesis of high molecular compounds, but also to place those in this category so long as they are regarded as the monomer component of the synthesized end compounds without regard to whether they are starting material for the synthesis or not). And, if their surface is covered by a hydrophilic polymer, even latexes containing in the nucleus a polymer which is not hydrophilic belong also to the hydrophilic polymer of the present invention.

Any of these hydrophilic polymers may be usable as long as they fall in the definition of the aforesaid solubility. Of such hydrophilic polymers, those which are particularly adaptable to the present invention are starch, dextrin, gelatine and maleic acid-vinyl acetate copolymers. The amount of such hydrophilic polymer used in the present invention varies depending on the king of plastic support, amount of hydrogen peroxide used, conditions for irradiation of ultraviolet rays and properties of a material to be allowed to adhere to the resulting hydrophilic polymer layer. Usually, however, the object may be accomplished when the hydrophilic polymer is used in an amount of from about 10 to 1000 mg/m$^2$ for coating the raw plastic support therewith, and particularly a practical and preferable amount of the polymer to be used is 20 to 200 mg/m$^2$.

These hydrophilic polymers may be used in the form of aqueous solution, however, they are in some cases conveniently incorporated with an organic solvent which is miscible with water. Further, such additives, for example, an antistatic agents, spreading agents, trace amounts of ultraviolet absorbing agents and other adjuvants may be optionally incorporated into the aqueous liquid to be coated in accordance with the present invention, however, an organic solvent may be added to such aqueous liquid in view of solubilities of these additives incorporated thereinto, or for the reason that drying efficiency may be enhanced by the addition of the organic solvent. However, there is no need for addition to the aqueous liquid of a swelling agent or the like for the plastic support in order to enhance adhesive property.

Hydrogen peroxide is used in admixture with an aqueous liquid of the aforesaid hydrophilic polymer. The amount of hydrogen peroxide used varies in the same manner as in the case of the hydrophilic polymer according to circumstances under which the range of amounts of the hydrogen peroxide may be adequately determined. However, good results may be obtained when it is used so that the coated amount thereof generally falls within the range of 0.1 to 5 g/m$^2$. Although peracetic acid has the similar properties as in hydrogen peroxide, the effect obtained by use of hydrogen peroxide is greater than that of peracetic acid.

As mentioned previously, the coating liquid used in the present invention may contain, if necessary, various additives. More concretely, as representatives of the usable additives, there may be mentioned, for example, anionic, nonionic or cationic surface active agents; matting agents such as silica particles and polymeric matting particles; dyes or pigments for antihalation or coloration; antistatic compounds; binders such as gelatine; suitable film hardening agents, for example, aldehyde type compounds such as formaldehyde, glyoxal and mucochloric acid, compounds having an ethyleneimino group such as tetramethylene-1,4-bis(ethyleneiminoureid), and hexamethylene-1,6-bis(ethyleneiminoureide), methanesulfonic acid esters such as trimethylene bis-methanesulfonate, active vinyl compounds such as bisacryloyl-urea and meta-xylene-divinylsulfone, compounds having active halogen such as 2-methoxy-4,6-dichloro-1,3,5-triazine and 2-sodiumoxy-4,6-dichloro-1,3,5-triazine, compounds having an epoxy group such as bis-phenolglycidyl ether, isocyanate, other polymers and copolymers or dispersions thereof. Provided that when such additives are apt to absorb ultraviolet rays, the amount of such additive used should be limited to the minimum.

Such aqueous coating liquid may be applied to a plastic support according to suitable coating means commonly employed depending generally on the form of a composition to be coated, for example, immersion coating, double roll coating, spraying, curtain coating, flow spreading, bead coating or the like means. Subsequently, the thus coated plastic support is irradiated with ultraviolet rays while the coated surface thereof is kept in a wet state, followed by drying. As a result, there is obtained according to the present invention, a plastic support improved in its adhesive property.

Further, such processing treatment as mentioned above may be applied, if necessary, not only to one side of the plastic support but also to both sides thereof, and in case the treatment is applied to both sides of the support, one side is first subjected to the treatment, followed by the treatment of the other side, or both sides may be simultaneously subjected to the treatment.

Plastic supports of certain kind are stretched in the course of steps for preparing same. In such case, the aqueous coating liquid may be applied to the support after stretching. Such supports may also be coated, prior to stretching, with the aqueous coating liquid and then may be stretched, and in the case of such supports subjected to biaxially stretching, the support may be coated, prior to the final stretching, with the aqueous coating liquid and thereafter may be subjected to the final stretching. In the case of supports subjected to thermal fixation, the support may be coated, before or after thermal fixing, with the aqueous coating liquid.

Suitable as plastic supports to which the present invention is applied, are those which are hydrophobic. As representatives of such plastic supports, there may be mentioned, for example, polyolefin supports; polystyrene supports; polyamide supports, polyester supports, representatives of which polyester are polyethylene terephthalate and polyethylene naphthalate; polycarbonate supports; and supports composed of such cellulose derivative as cellulose triacetate. Particularly, the present invention is effectively applicable to polyethylene terephthalate support, polycarbonate support and polypropylene support. These supports may be in the form of either film or sheet. In the case of so-called composite bodies comprising two or more layers, any body may be usable so long as at least one surface of said body is composed of such plastics as mentioned above. In such case, other layers may be composed of other materials such as paper. These plastic supports may contain colorants such as dyes or pigments, ultraviolet preventing agents, fluorescent dyes, opacifiers such as carbon ot titanium oxide, matting agents, antistatic agents and the like.

Further, the surface of plastic support, prior to coating the plastic support with the aqueous coating liquid, may be subjected to suitable pretreatment. For instance, the so-called corona discharge treatment or flame treatment may be applicable to the plastic support. If necessary, ultraviolet irradiation treatment may be applicable as a pretreatment. The corona discharge treatment is a discharge treatment using an apparatus in which accelerated electrons are discharged between a pair of electrodes, and other electron impulse treatments similar thereto may also be effectively usable. The flame treatment is to treat the support surface with oxidizing flame. In that case, any flame may be usable so long as it produces oxidizing flame.

Further, the surface of support, the adhesive property of which has been improved, may be subjected further to the above-mentioned after-treatment such as corona discharge treatment or flame treatment.

On the surface of plastic support, to which the adhesion-improving method of the present invention has been applied, there may be further provided an auxiliary layer such as a layer containing an antistatic agent, a layer containing gelatine, a layer containing the aforementioned film hardening agent, a layer containing a dispersion of silicon dioxide or a layer containing two or more substances to be contained in the above layers. Provision of such auxiliary layer is effective in preparing, for example, light-sensitive silver halide photographic materials, particularly when the materials are rapidly dried at the time of preparing the same.

The surface of plastic support having an improved adhesive property in accordance with the present invention may be coated, after drying once, with other layers, for example, the above-mentioned auxiliary layer or a layer on which a light-sensitive silver halide photographic layer is coated. In such case, however, the other layers may be coated on the surface of the plastic support without drying and subsequently the whole of the thus coated support may also be dried. In the case where such support is coated with the other layers, without drying, the ultraviolet irradiation according to the present invention may be applied to the support after forming the other layers thereon.

In the present invention, it is effective in improving adhesive property of the plastic support to irradiate the surface of the support, after coating thereon the aqueous coating liquid containing a hydrophilic polymer and hydrogen peroxide, with ultraviolet rays while the coated aqueous liquid still keeps its wet state. In case the ultraviolet irradiation is conducted after the coating liquid coated on the support surface has been dried once, no desired enhancement in adhesive property is obtained. That is, it is considered that when the support coated with the aqueous coating liquid is dried, no enhancement of desired adhesive property is obtained because hydrogen peroxide evaporates and does not exist in the system any longer, whereas the hydrogen peroxide should be present in the coating liquid at the time of irradiation with ultraviolet rays in order to enhance adhesive property of the support. When the coated surface of the support is dried before irradiation with ultraviolet rays, unevenness commonly called local thickening depending on the kind of polymer contained in the coating liquid or amount thereof, and no homogeneous, even and smooth surface cannot be formed in some cases. For that account, there is brought about such drawback that such support having unevenness on its coated surface is undesirable from practical point of view as a plastic support to be provided in various applications, even if adhesive property of the support may be somewhat improved. However, in case a coating liquid which does not form unevenness is used, the support surface coated with the coating liquid is once dried and then treated with an aqueous solution of hydrogen peroxide so that the hydrogen peroxide is made present again in the coated surface, and then the thus treated support surface may be irradiated with ultraviolet rays under such condition where the hydrogen peroxide is present in the coated surface kept in a wet state, thereby improving adhesive property of the support as desired. In this way, it is an indispensable requisite in the present invention to keep the coated surface, when irradiated with ultraviolet rays, in a wet state where hydrogen peroxide is present.

In the manner as described hereinbefore, a layer composed essentially of a hydrophilic polymer (hereinafter referred to as "polymer layer") is formed on at least one surface of a plastic support. The plastic support having formed thereon the polymer layer has excellent adhesion to a substance which is to be coated thereon, particularly adhesion of the support to a hydrophilic layer is enhanced. Moreover, in preparing plastic supports in accordance with the present invention, there is no fear of contamination of operation environment and atmosphere because the use of harmful compounds is not necessary for the performance of the invention, the adhesive property of the present support does not change according to surrounding atmosphere. For instance, there is such advantage that the adhesive property of the present support does not change under dry condition or even under wet condition. Moreover, no adverse influence is exerted upon characteristics of a material which is coated on the surface of the present support.

Accordingly, the present invention is effective when applied especially to the technical field of photography. For instance, a photographic gelatin layer, for example, a light-sensitive silver halide layer, a filter layer, an interlayer, an antihalation layer or an image-receiving layer, may be strongly fastened to the surface of plastic support having an improved adhesive property in accordance with the present invention. In addition thereto, there are such advantages that such photographic gelatin layers formed on the present plastic support do not peel off therefrom even when the support is subjected to photographic processing such as development treatment, that no adverse effects (e.g. degradation of speed and increased formation of fog) on photographic efficiencies of the photographic gelatine layers is brought about, and that physical properties of the surface of the present support are not adversely affected, for example, by degradation of evenness (physical degradation of the support surface sometimes exerts undesirable influence upon photographic characteristics). Further, the plastic support having an improved adhesive property in accordance with the present invention may be coated thereon with other layers, besides the photographic gelatine layer, for example, those comprising various compositions, for example, light-sensitive diazonium compositions, light-sensitive resin compositions, magnetic recording compositions, etc. In that case, such layers strongly adhere to the surface of the present support surface, and respective characteristics of the resulting materials are not deteriorated.

The present invention is concretely illustrated below with reference to examples. However, it should be construed that embodiments of the present invention are not limited only to these examples.

EXAMPLE 1

To a solution of 0.5 g of starch in 95 ml of water was added 5 ml of a 30% hydrogen peroxide solution to obtain a processing liquid (a). Into the processing liquid (a) was immersed a polyethylene terephthalate film of 180 $\mu$ in thickness, which had been biaxially stretched and thermally fixed, whereby both sides of the film were individually coated with the processing liquid (a) in the proportion of 25 ml/m$^2$. The thus coated surfaces were individually irradiated, while they are still in their wet state, from both sides for 2 minutes at a distance 10 cm apart from each coated surface with a pair of 60-watt low pressure mercury-arc lamps (GL 60 manufactured and sold by Tokyo Shibaura Electric Works Co., Ltd.), and then dried to obtain a sample (1).

The same processing procedure as employed in the preparation of the sample (1) was repeated, except that a processing liquid (a') obtained by dissolving 0.5 g of starch in 100 ml of water and a processing liquid (a'') prepared by dissolving 10 ml of a 30% hydrogen peroxide solution in 90 ml of water were individually used in lieu of the processing liquid (a), to obtain control samples (2) and (3), respectively. By the way, in the course of preparing the sample (1), when said sample was dried without applying the ultraviolet irradiation thereto, whereby unevennesses in thickness were formed on the coated during drying and no homogeneous, flat and smooth sample was obtained.

The sample (1) and control samples (2) and (3) thus obtained were individually coated, according to usual procedure, on the processed surface with a common light-sensitive silver bromide photographic emulsion containing gelatine as a binder and then dried to obtain the respective samples of light-sensitive silver halide photographic material. The samples thus obtained were individually subjected to the following tests. That is, there were conducted the test for adhesion between the emulsion layer and the plastic support in a dry state (dry layer adhesion test) and the test for adhesion between the emulsion layer and the plastic support in a processing bath (wet layer adhesion test).

[Dry layer adhesion test]

The emulsion surface of each sample was scratched in a checker pattern (width of each scratched line : about 0.1 mm) with a razor so that each cut ran down practically to the support surface, a cellophane adhesive tape was pressed to the scratched emulsion layer and then rapidly peeled off therefrom, and the ratio of the residual area to the cellophane adhesive tape-attached area was represented by percentage.

If the ratio obtained is 100%, this means that the emulsion layer does not peel off at all and the adhesion thus attained (adhesion between the emulsion layer and the support) is extremely strong, and if the ratio obtained is 0%, this means that the emulsion layer within the cellophane adhesive tape-attached area was totally peeled off from the support. Accordingly, the larger is the ratio, the stronger is the adhesion of the emulsion layer (or other substances to be attached to) to the support. Practically, however, if the ratio obtained is more than about 80%, the adhesion attained is deemed sufficient without causing any trouble.

[Wet layer adhesion test]

Each sample was dipped in a bath containing a processing solution, the emulsion layer surface of the sample was scratched in a checker pattern (width of each cut : about 0.1 mm) with an end of a sharp-pointed gimlet-like tool, the thus scratched emulsion surface was rubbed with the tip of a finger, and the ratio of the residual area of the emulsion layer to the area of the scratched and rubbed emulsion surface was represented by percentage. Similarly, the larger is the ratio, the better is the result. No practical trouble is caused, however, if the ratio obtained is more than about 80%.

In this test, a common developer for Roentgen film was used as the processing solution.

The results obtained in the above tests were as shown in Table 1.

Table 1

| Sample No. | Dry layer adhesion test (%) | Wet layer adhesion test (%) |
|---|---|---|
| 1 | 100 | 100 |
| 2 | 0 | 0 |
| 3 | 5 | 20 |

From Table 1 above, it is understood that the plastic support (sample 1) according to the present invention is excellent in adhesion to the substance to be attached thereto in either a dry state or a wet state. The plastic support of the present invention was recognized to have excellent characteristics as support for photographic purposes as evidence by the results obtained in the development processing of the sample (1), showing no degradation on photographic characteristics such as lowering of gamma, formation of fog, etc.

In place of the biaxially stretched and thermally fixed polyethylene terephthalate film, there was prepared a sample by processing a polyethylene terephthalate film, which had been biaxially stretched but not thermally fixed, in the same procedure as used in the preparation of the sample (1), followed by thermal fixation. The sample thus prepared was subjected to the tests in the same manner as in the present example. The results obtained showed that the adhesion attained was excellent similarly to those of the case of the sample (1) and no degradation of photographic characteristics was observed.

EXAMPLE 2

To a solution of 0.3 g of gelatine in 90 ml of water was added 10 ml of a 30% hydrogen peroxide solution to obtain a processing liquid (b). Using a double roll coater, a polyethylene terephthalate film of 100 $\mu$ in thickness, which had been biaxially stretched and thermally fixed, was coated on its one side of the surfaces with the processing liquid (b) in the proportion of 20 ml/m$^2$. The thus coated surface was irradiated, while it is still in its wet state, for 2 minutes at a distance 3 cm apart from the coated surface with a 15-watt low pressure mercury-arc lamp (GL 15 manufactured and sold by Tokyo Shibaura Electric Works Co., Ltd.), and then dried to obtain a sample (4).

The same processing procedure as employed in the preparation of the sample (4) was repeated, except that a processing liquid (b') prepared by dissolving 0.1 g of gelatine in 100 ml of water and a processing liquid (B") obtained by dissolving 3 ml of a 30% hydrogen peroxide solution in 97 ml of water were individually used in lieu of the processing liquid (b), to obtain control samples (5) and (6), respectively. By the way, in the course of preparing the sample (4), no homogeneous, flat and smooth sample could be obtained when the sample was dried without applying the ultraviolet irradiation thereto.

The sample (4) and control samples (5) and (6) thus obtained were individually coated, according to usual procedure, on the processed surface with a common light-sensitive silver chlorobromide photograhic emulsion containing gelatine as a binder and then dried to obtain the respective samples for evaluation of adhesion. Each sample was subjected to the same tests as in Example 1 to obtain the results as shown in Table 2. In the wet layer adhesion test conducted in the present example, a common developer for lith type film was used as the processing solution.

Table 2

| Sample No. | Dry layer adhesion test (%) | Wet layer adhesion test (%) |
|---|---|---|
| 4 | 100 | 100 |
| 5 | 0 | 0 |
| 6 | 10 | 20 |

As is clear from the above Table 2, it is understood that the plastic support according to the present invention is excellent in adhesion to the substance to be attached thereto in all states, dry and wet. The sample according to the present invention, when developed, did not cause any degradation in photographic properties of the emulsion layer, such as lowering of gamma, formation of fog and the like, and was recognized to have excellent characteristics as support for photographic purposes.

EXAMPLE 3

2 Grams of a 1 : 1 vinyl acetate-maleic anhydride copolymer and 60 ml of water were stirrd for a short time to obtain a solution. To the solution were added 40 ml of a 30% hydrogen peroxide solution and 5 mg of sodium alkylbenzenesulfonate (surface active agent) to obtain a processing liquid (c). The processing liquid (c) was cast in the proportion of 35 ml/m$^2$ on one side of the surfaces of an unstretched polycarbonate film of 100 $\mu$ in thickness, and the thus cast surface was irradiated, while it is still in its wet state, for 30 seconds at a distance 10 cm apart from the cast surface with a 300 -watt medium pressure mercury-arc lamp (UL 2-3 UK 9 manufactured and sold by Ushio Electric K.K.), and then dried to obtain a sample (7).

The same processing procedure as employed in the preparation of the sample (7) was repeated, except that a processing liquid (c') prepared by stirring for a short time 2 g of a 1:1 vinyl acetate-maleic anhydride copolymer with 100 ml of water to obtain a solution and adding 5 mg of sodium alkylbenzenesulfonate to the solution and a processing liquid (c") prepared by dissolving 20 ml of a 30% hydrogen peroxide solution and 5 ml of sodium alkylbenzenesulfonate in 80 ml of water were individually used in lieu of the processing liquid (c), to obtain control samples (8) and (9). Separately, the same procedure as employed in the preparation of the sample (7) was repeated, except that the ultraviolet irradiation was omitted, to obtain a control sample (10).

Further, the surface of the control sample (10) was subjected to ultraviolet irradiation under the same conditions as employed in the irradiation applied to the sample (7) to obtain a control sample (11).

The thus obtained sample (7) and control samples (8), (9), (10) and (11) were individually coated on the processed layer with a liquid obtained by dissolving and dispersing 8 g of gelatine, 0.5 g of carbon black powder and 0.3 g of glyoxazol in 100 ml of water, followed by drying to form on said processed layer a black filter layer. Each sample was subjected to the same dry layer adhesion test as in Example 1, to obtain the results as shown in Table 3.

Table 3

| Sample No. | Dry layer adhesion test (%) |
| --- | --- |
| 7 | 100 |
| 8 | 10 |
| 9 | 10 |
| 10 | 0 |
| 11 | 10 |

As is clear from the above Table 3, it is understood that the plastic support (sample 7) according to the present invention is excellent in adhesion to the substance to be attached thereto. On the other hand, it is understood that all the control samples are insufficient in the adhesion, and even the control sample (11) which had been subjected to ultraviolet irradiation after coating with the aqueous coating liquid and drying, was also insufficient in the adhesion in the same way as in the other control samples Separately, the samples (7), (8), (9), (10) and (11) were individually coated with a common light-sensitive silver halide photographic emulsion and dried. Each of the emulsion-coated samples was subjected to the same dry layer and wet layer adhesion tests as in Example 1, whereby the sample (7) according to the present invention solely gave good results in both tests.

EXAMPLE 4

To a solution of 0.2 g of dextrin in 90 ml of water was added 10 ml of a 30% hydrogen peroxide solution to obtain a processing liquid (d). Using a double roll coater, an unstretched polypropylene film of 100 $\mu$ in thickness was coated on its one side of the surfaces with the processing liquid (d) in the proportion of 20 ml/m$^2$. The thus coated surface was irradiated in a moist and cold air stream for 2 minutes at a distance 10 cm apart from the coated surface with a 2-kilo watt medium pressure mercury-arc lamp (UM-2018 K 10 manufactured and sold by Ushio Electric K.K.) and then dried to obtain a sample (12).

The same processing procedure as employed in the preparation of the sample (12) was repeated, except that processing liquids (d') and (b'') were individually used in lieu of the processing liquid (d) to obtain samples (13) and (14), respectively. By the way, in the course of preparing the sample (12), when said sample was dried without applying the ultraviolet irradiation thereto, unevenness in thickness of the coated layer occured during drying and no homogeneous, flat and smooth sample could be obtained.

The thus obtained sample (12) and control samples (13) and (14) were individually coated on the processed layer with a liquid prepared by dissolving and dispersing 1 g of nitrocellulose and 1 g of titanium dioxide, respectively, in 10 ml of acetone, followed by addition of methanol, and then dried to obtain a white film printable on the surface with a water-color ink.

The samples thus processed were individually subjected to the same tests as in Example 1 to obtain the results as shown in Table 4. In the wet layer adhesion test conducted in the present example, a 1% aqueous sodium carbonate solution was used as the processing solution.

Table 4

| Sample No. | Dry layer adhesion test (%) | Wet layer adhesion test (%) |
| --- | --- | --- |
| 12 | 100 | 100 |
| 13 | 0 | 0 |
| 14 | 10 | 10 |

As is clear from the above Table 4, it is understood that the plastic support (sample 12) according to the present invention is excellent in adhesion to the substance to be attached thereto in all cases, dry and wet. Separately, the samples (11), (12) and (13) were individually coated with a common light-sensitive silver halide photographic emulsion in lieu of the water-color ink printable layer and then dried to obtain the respective test samples. Each test sample was subjected to the same adhesion tests as in Example 1, whereupon the sample (12) solely showed excellent adhesive property both in dry and wet states and was recognized not to degrade any photographic efficiencies.

EXAMPLE 5

The sample (1) of Example 1 was coated on the processed surface with a processing liquid, which has been prepared by 0.2 g of an antistatic agent, i.e. the exemplified compound (1) disclosed in Japanese Patent Publn. No. 24159/1971, in 100 ml of water, in the proportion of 20 ml/m$^2$ and then dried to obtain a sample (15) improved in antistatic property. Subsequently, the sample (15), and the samples (2) and (3) of Example 1 were individually coated on the surface with a light-sensitive silver halide photographic emulsion in the same manner as in Example 1 and then dried to obtain the respective test samples. The test samples were individually subjected to the adhesion tests to obtain the results as shown in Table 5.

Table 5

| Sample No. | Dry layer adhesion test (%) | Wet layer adhesion test (%) |
| --- | --- | --- |
| 15 | 100 | 100 |
| 2 | 0 | 0 |
| 3 | 5 | 20 |

As is clear from the above Table 5, it is understood that the plastic support (sample 159 according to the present invention is excellent in adhesive property both in dry and wet states. The sample of the present invention, when developed, did not cause any degradation in photographic efficiencies and bring about any formation of static mark due to charging during the preparation step thereof.

EXAMPLE 6

The sample (4) of Example 2 was coated on the processed surface with a processing liquid, which had been prepared by dissolving 0.5 g of gelatine in 90 ml of water, followed by addition of 0.3 g of hexamethylene-1,6-bis-ethyleneiminoureid and 10 ml of a 10% colloidal solution of silicon dioxide, in the proportion of 20 ml/m² and then dried to obtain a sample (16) free of tackiness. Subsequently, the sample (16), and the samples (4), (5) and (6) of Example 2 were individually coated on the surface in the same manner as in Example 2 with a light-sensitive silver halide photographic emulsion and then rapidly dried. Each sample was subjected to the adhesion tests to obtain the results as shown in Table 6.

Table 6

| Sample No. | Dry layer adhesion test (%) | Wet layer adhesion test (%) |
|---|---|---|
| 16 | 100 | 100 |
| 4 | 90 | 95 |
| 5 | 0 | 0 |
| 6 | 0 | 10 |

As is clear from the above Table 6, it is understood that the plastic support (sample 16) according to the present invention is excellent in adhesion to the substance to be attached thereto both in dry and wet states.

Further, the sample of the present invention, when developed, did not cause any degradation in photographic efficiencies and bring about any trouble due to coherence of the processed surface to various equipments in contact therewith in the course of preparation step.

What we claim is:

1. A method of improving adhesive property of plastic supports which comprises coating the plastic support on the surface with an aqueous liquid containing a hydrophilic polymer and hydrogen peroxide and irradiating the coated surface with ultraviolet rays while keeping said coated surface in its wet state where the hydrogen peroxide is present.

2. A plastic support produced by using the method of claim 1, said support having improved adhesive property.

* * * * *